United States Patent [19]
Falt et al.

[11] Patent Number: 5,278,747
[45] Date of Patent: Jan. 11, 1994

[54] DC/AC CONVERTER WITH OVERCURRENT PROTECTION BY TEMPORARY SHUTDOWN

[75] Inventors: Johan A. M. Falt; Mats R. Karlsson, both of Göteborg, Sweden

[73] Assignee: Aktiebolaget Electrolux, Sweden

[21] Appl. No.: 849,421

[22] PCT Filed: Sep. 11, 1991

[86] PCT No.: PCT/SE91/00602

§ 371 Date: May 7, 1992

§ 102(e) Date: May 7, 1992

[87] PCT Pub. No.: WO92/05610

PCT Pub. Date: Apr. 2, 1992

[30] Foreign Application Priority Data

Sep. 14, 1990 [SE] Sweden ................... 9002937

[51] Int. Cl.[5] .......................................... H02M 5/458
[52] U.S. Cl. ...................................... 363/37; 363/56; 363/98; 363/132; 361/87
[58] Field of Search ................ 363/17, 56, 97, 98, 363/131, 132, 34, 37; 361/75, 87, 93

[56] References Cited

U.S. PATENT DOCUMENTS

| | | | |
|---|---|---|---|
| 3,914,675 | 10/1975 | Konrad | 318/453 |
| 4,330,016 | 5/1982 | Imazeki et al. | 363/56 |
| 4,447,841 | 5/1984 | Kent | 363/56 |
| 4,521,840 | 6/1985 | Hoadley | 363/37 |
| 4,706,177 | 11/1987 | Josephson | 363/132 |
| 4,709,292 | 11/1987 | Kuriyama et al. | 361/22 |
| 4,719,555 | 1/1988 | Hattori et al. | 363/56 |
| 4,761,702 | 8/1988 | Pinard | 363/56 |
| 4,809,122 | 2/1989 | Fitzner | 363/56 |
| 4,827,392 | 5/1989 | Miguchi | 363/98 |
| 4,937,724 | 6/1990 | Nakajima | 363/56 |
| 5,029,269 | 7/1991 | Elliott et al. | 363/56 |

*Primary Examiner*—J. L. Sterrett
*Attorney, Agent, or Firm*—Pearne, Gordon, McCoy & Granger

[57] ABSTRACT

A power supply for generation of a mainly sinusoidal output voltage, the magnitude and frequency of which are adapted for driving of main power-operated apparatuses. The power supply includes means (10) for generating a DC voltage, a DC/AC converter (18) including controlled semiconductor switches (19,20,21,22) and an electric control device (30) for emitting to the semiconductor switches suitable commutating signals according to a predetermined program to keep the switches closed and open, respectively, such that the desired waveform for the output voltage is achieved. Sensing of a parameter associated with the load current of the power supply is associated with the load current of the power supply is provided and cooperates with the control device (30) such that upon the load current exceeding a predetermined value the commutating signals are cancelled. The commutating signals are thereafter reconnected after a period of time which is considerably less than half the period of the output voltage. The control device (30) emits commutating signals continuously with breaks determined by the load current exceeding the predetermined value.

7 Claims, 2 Drawing Sheets

DC/AC CONVERTER WITH OVERCURRENT PROTECTION BY TEMPORARY SHUTDOWN

BACKGROUND OF THE INVENTION

The present invention refers to a power supply and, more specifically, a power supply which generates a mainly sinusoidal voltage to be used in supplying apparatuses that are normally operated from the main power.

In caravans and motor caravans electric apparatuses and other equipment are found which are operated by low voltage DC current from, for example, a car battery or the like. In addition, there is often other equipment which is operated from the main power and which can be used only when the caravan is connected to the main power, for example at a caravan site.

Now, it is desired to provide a power supply by which it will be possible to use main power operated equipment even when the caravan is not situated at a caravan site, or the like, and, accordingly, cannot be connected to the main power. Such a power supply could be comprised by a unit generating a DC voltage and being associated with a DC/AC converter which, by means of switching technique known in the art, converts the DC voltage to a mainly sinusoidal AC voltage of the desired magnitude, for example 110 volts or 220 volts. Suitably, the DC voltage generating unit could be a three-phase AC generator of the kind to be found in cars for their electric supply. A generator of the kind referred to comprises a rectifying device providing a DC voltage output from the generator. Such a generator together with a DC/AC converter constructed by known techniques can be provided in the engine compartment of a car or motor caravan and be terminated with an AC outlet. Then, by a suitable line, the passenger compartment of the motor caravan or a caravan connected to the car can be supplied.

A power supply of the kind referred to has to be protected against excess current and to this end protecting arrangements are provided which disconnect the power supply when the load current exceeds a predetermined value. The art offers a solution in case of a disconnection reconnection is allowed after the lapse a time period corresponding to one or two periods of the AC voltage. If inductive loads, such as an induction motor of a refrigerator or an air conditioner, are to be supplied, the delayed reconnection is a disadvantage as sufficient energy will not be supplied to the motor to have it rotate before disconnection takes place due to overcurrent. Hence, under certain conditions it may happen that the compressor motor in the refrigerator or in the air conditioner, respectively, cannot be started.

SUMMARY OF THE INVENTION

The object of the invention is to remedy the drawback in the prior art and to provide a power supply of the kind referred to above at which reconnection takes place after a time period which is considerably smaller as compared to half the period of the AC voltage. This means that reconnection takes place almost immediately after a disconnection has occurred so that there will be no substantial drop of current below the predetermined current limit. Hence, the current is upheld and sufficient energy supplied for bringing the motor to start.

BRIEF DESCRIPTION OF THE DRAWINGS

The invention will now be described more with reference to the enclosed drawings in which.

DETAILED DESCRIPTION OF THE PREFERRED EMBODIMENT

Figure 1:
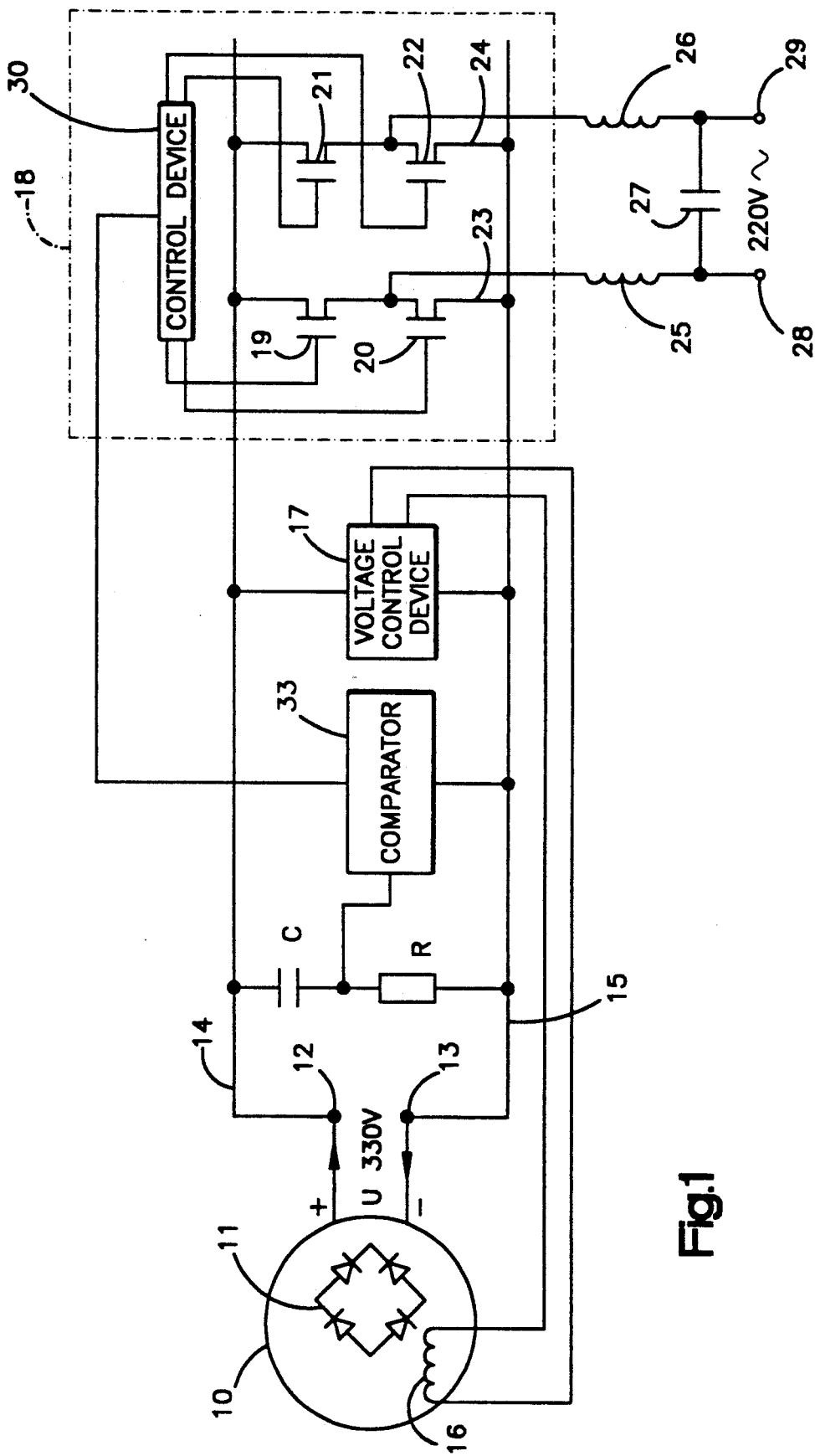
FIG. 1 is a block diagram for a power supply according to the invention.

In FIG. 1 there is shown a block diagram for a power supply according to the invention in which an AC generator 10 is provided which, via a rectifier device 11, generates a DC voltage U across a positive terminal 12 and a negative terminal 13. A conductor 14 is connected to the positive terminal 12 while a conductor 15 is connected to the negative terminal 13. The generator 10 has a field winding 16 and the voltage U is controlled by a control device 17 which, upon need, increases or decreases the voltage to the field winding 16.

The circuit of FIG. 1 further comprises an DC/AC converter 18 in which are included four semiconductor switches of the mosfet type 19,20,21,22, in a known way forming a bridge. The connecting points between the transistors 19 and 20 and between the transistors 21 and 22, respectively, form the output terminals of the bridge between which the output voltage of the power supply appears. Conductors 23 and 24 connect the connecting points with one respective choking coil 25,26 the opposite ends of which are interconnected by a capacitor 27 and, further, are connected to two terminals 28,29 forming the output terminals of the power supply.

A control device 30 is provided for supplying to the semiconductor switches 19, 20, 21, 22 suitable commutating signals according to a predetermined program. According to this program each of the half periods of the sinusoidal output voltage is assumed to be divided into sections and for each section a combination of commutating signals is stored which for the respective section determines which switches are to be closed and which are to be open in order for the output voltage to assume the desired sinusoidal shape. How to carry out this in practice will be hereafter described in more detail with reference to FIG. 2.

In order to maintain the voltage level during varying load conditions, in a known way a bank of capacitors is provided, here represented by a capacitor C which is connected to conductor 14 and, via a low-resistant measurement resistor R to conductor 15. The voltage across the measurement resistor 15 forms a parameter which depends on the load current of the power supply and which is used to switch off the supply when overcurrent occurs. Hence, the connecting point between the measurement resistor R and the capacitor C is connected to a comparator 33 in which the voltage is compared with a reference value. If the voltage exceeds said reference value a signal is emitted from the comparator 33 to the control device 30 causing cancellation of the commutating signals to the semiconductor switches 19, 20, 21, 22. According to the invention, this disconnection is very short and is followed, almost immediately, by a reconnection of the commutating signals. This will be described more in detail in connection with FIG. 2.

Figure 2:
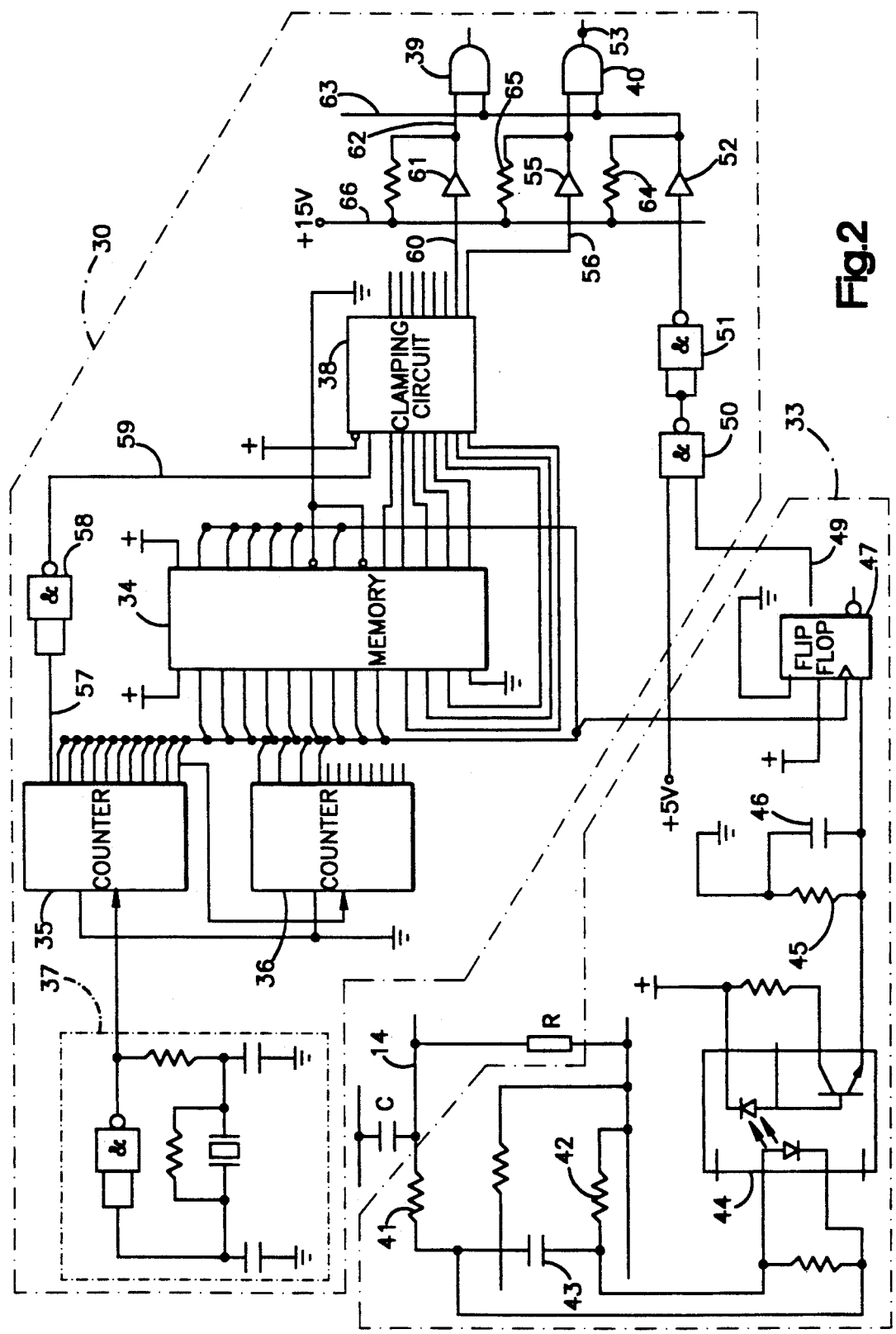
FIG. 2 is a practical circuit diagram for a preferred embodiment in non-essential parts have been omitted.

Leaving the block diagram of FIG. 1 we are now turning to a practical circuit diagram shown in FIG. 2. In order to create combinations of control signals for setting of the four semiconductor switches in each section of the sinusoidal output voltage to be formed, in a known way, simultaneously a sine wave and the invers of it are compared with a triangular wave having the same amplitude as the sine waves but being of a considerably higher frequency. Briefly, the condition for the switches to open for the supply of energy is that the triangular wave is within the envelope formed by the sine waves.

As made apparent from the above, the two half periods of the sine wave are divided into a number of sections and for each section a combination of control signals is set to control which of the switches are to be open and which are to be closed, respectively, in said section. The combinations of control signals for all sections are stored in a programmable memory 34 and each combination comprises eight digital bits. Each combination has a 16-bit address and the combinations are arranged in the memory such that they can be emitted in the order that causes the desired sinusoidal shape of the output voltage to be formed. The combinations are read from the memory 34 by means of a counter 35, 36 stepped by means of an oscillator 37 operating at the frequency of 3.27 MHz. In order to ensure that all bits of a combination be correctly read in time the bits so read are accumulated in a clamping circuit 38 from which the bits are clocked to eight AND-gates of which only two, 39, 40, have been shown in the circuit diagram. Then, at the outputs of the AND-gates those control signals appear which determine the switching state of the four semiconductor switches. The way these control signals are shaped and supplied to the switches and the type of switch chosen or the way of arranging the switches are inessential to the invention and, hence, will not be described in detail.

As in FIG. 1, in order to detect overcurrent a low-resistant measurement resistor R is being connected in series with the bank of capacitors C and the voltage appearing across the resistor is, via a filter comprising two resistors 41, 42 and a capacitor 43, led to the input of an opto switch 44. The output of the opto switch is connected to ground via a resistor 45 in parallel with a capacitor 46. The output is also connected to the RESET-input of a flip-flop 47. The clock input Cl of the flip-flop is, via a conductor 48, connected to an output of the counter 35, 36 chosen such that the the clock frequency is about 2 kHz. Via a conductor 49, the output of the flip-flop is connected to one input of an AND-gate 50. The other input of the AND-gate is connected to the supply voltage +5 volts. The output of the AND-gate is, via an inverter 51 and a buffer circuit 52, connected to one input of the AND-gate 40, at the output 53 of which one of the bits of a digital control signal for the semiconductor switches appears. The other input of the AND-gate 40 is, via a conductor 54, connected to the output of a buffer circuit 55, the input of which, via a conductor 56, is connected to one of the outputs of the clamping circuit 38.

The clamping circuit is controlled by clock pulses supplied to a clock input CLK from an output of the counter 35, 36 via a conductor 57, an inverter 58 and another conductor 59. Further, via a conductor 60, one of the outputs of the clamping circuit 38 is connected to the input of a buffer circuit 61 the output of which, via a conductor 62, being connected to one input of the AND-gate 39. The other input of the AND-gate 39 is connected to a conductor 63 interconnecting the corresponding inputs of all eight AND-gates, of which only two 39,40 have been shown, the conductor 63 being connected to the output of the buffer circuit 52. The conductors 54 and 62 are, via the respective resistors 64,65, connected to a conductor 66 connected to the supply voltage +15 volts.

The function of the embodiment generally shown in FIG. 1 and more in detail in FIG. 2 will now be described. It is assumed that the generator 10 is rotating, for example driven by the motor of a motor caravan, and that the voltage U is established across the conductors 14 and 15. Now, in a way not shown, also the supply voltages for the electronic components are generated, such as those marked +5 volts and +15 volts. The oscillator 37 is operating and feeds clock pulses of the frequency of 3.27 MHz to the counter 35,36 (two cases). In operation, the counter is always counting-up until it reaches its highest count position from which it recommences. For each step an address is given to the memory 34 and the contents of this address is fed to the clamping circuit 38. As has been previously mentioned, the contents is an eight-bit digital combination of control signals for the semiconductor switches 19,20,21,22 (FIG. 1) determining which of the switches to be closed and which to be open in a predetermined section in any of the half periods of the sinusoidal output voltage. Upon a clock signal being emitted from the counter 35,36 on the conductor 57 the clamping circuit 38 feeds its information to the AND-gates 39,40 (and to the remaining six AND-gates, not shown) and the states at the outputs of the AND-gates constitute the desired control information for the semiconductor switches. Accordingly, as the counter is continuously stepped up those various combinations of control signals will be emitted, one upon the other, which are required to give to the output voltage the desired sinusoidal shape.

If a current which is larger than can be handled by the power supply is drawn by a load, the current through the measurement resistor R, flowing towards capacitor C, will cause a voltage to be established across the input of the opto switch 44 which is sufficient for generating a flow of light in said opto switch which activates a light-sensitive diod causing a transistor to be activated which gives high level at the output of the opto switch. As a result, the flip-flop 47 is reset giving a high level at the output of the AND-gate 50, low level at the output of the inverter 51 and low level at the output of the buffer circuit 52. Hence, one input of the AND-gates 39,40 (and of the remaining six) will take a low level causing all control signals to be stopped.

After a time period of about 0.5 milliseconds (corresponding to the frequency 2 kHz) a clock pulse appears on the conductor 48 which sets the flip-flop 47 and causes a low level at one input of the AND-gate 50. As a result, the inputs of the AND-gates 39,40 connected to the conductor 63 will again take a high level. Accordingly, information from the clamping curcuit 38 can again pass the AND-gates 39,40 for the control of the semiconductor switches. Hence, the reconnection of the switches takes place after a short period of time, of the magnitude of 0.5 milliseconds, which is well within the half period of 10 milliseconds where overcurrent was detected and the power supply switched off. If overcurrent should again be detected several reconnections can be made within a half period of the output voltage permitting activation of inductive loads, such as motors and the like which can be started and driven from the power supply described. In a load as referred to the start current is high whereas the continuous working current is considerably lower. Such repeated restarts take place at intervals determined by the clock pulse frequency of about 2 kHz, mentioned above.

We claim:

1. Power supply for generating a mainly sinusoidal output voltage the magnitude and frequency of which being adapted for driving of apparatuses supplied from main power, comprising means (10) for generating a DC voltage, a DC/AC converter (18) including controlled semiconductor switches (19,20,21,22), and an electric control device (30) emitting to the semiconductor switches suitable commutating signals in accordance with a predetermined program to keep said switches open and closed, respectively, such that a desired shape of the output voltage is achieved, wherein means (R) for sensing a parameter associated with a load current of the power supply is provided, said sensing means cooperating with the control device (30) such that when the load current exceeds a predetermined value the commutating signals are cancelled, said commutating signals being reconnected after a period of time which is considerably less than half a period of the output voltage, said control device (30) being arranged to continuously emit commutating signals with breaks determined by the load current exceeding the predetermined value, wherein the electric control device (30) comprises a memory (34) in which the predetermined program is stored in such way that for forming of the output voltage consecutive combinations of closed and open semiconductor switches, respectively, have corresponding consecutive addresses in the memory, and counter means (35,36) are arranged to read out the combinations by being stepwise counted up and in each step to transfer the respective combination to a clamping circuit (38) from which the combination is being clocked to a logic network comprising a number of AND-gates (39,40 etc.) so that each bit of the combination appears as a logical signal at one input of the respective AND-gates (39,40 etc.) while at the other input a signal appears which during normal operation permits the transfer of the combinations to the semiconductor switches and upon overcurrent determines the frequency of reconnection.

2. Power supply according to claim 1, wherein the measurement resistor (R) is connected to an input of an opto switch (44), an output of the opto-switch being connected to a flip-flop (47) such that upon overcurrent the flip-flop is resetted, an output signal of the flip-flop being transferred to remaining inputs of the AND-gates (39,40 etc.) connected to the clamping circuit (38) via suitable gate means (50,51) for applying a low level on same thereby preventing commutating signals from being generated.

3. Power supply according to claim 2, wherein the input of the opto switch (44) is connected to the measurement resistor (R) via a filter comprising a capacitor (43) in series with two resistors (41, 42), connected to each respective side of the capacitor, said capacitor being connected to said opto switch input and free ends of a respective resistor being connected to a respective terminal of the measurement resistor (R).

4. Power supply for generating a mainly sinusoidal output voltage the magnitude and frequency of which being adapted for driving of apparatuses supplied from main power, comprising means (10) for generating a DC voltage, a DC/AC converter (18) including controlled semiconductor switches (19,20,21,22), and an electric control device (30) emitting to the semiconductor switches suitable commutating signals in accordance with a predetermined program to keep said switches open and closed, respectively, such that a desired shape of the output voltage is achieved, the DC voltage generating means (10) having an output with two output terminals (12,13) and comprising a smoothing capacitor (C) connected in series with a low-resistance measurement resistor (R) across the output terminals (12,13), wherein means (R) for sensing voltage across the measurement resistor is provided, said sensed voltage being proportional to a load current of the power supply, said sensing means cooperating with the control device (30) such that when the load current exceeds a predetermined value the commutating signals are cancelled, said commutating signals being reconnected after a period of time which is considerably less than half a period of the output voltage, said control device (30) being arranged to continuously emit commutating signals with breaks determined by the load current exceeding the predetermined value.

5. Power supply according to claim 4, wherein the measurement resistor (R) is connected to an input of an opto switch (44), an output of the opto-switch being connected to a flip-flop (47) such that upon overcurrent the flip-flop is resetted, an output signal of the flip-flop being transferred to remaining inputs of the AND-gates (39,40 etc.) connected to the clamping circuit (38) via suitable gate means (50,51) for applying a low level on same thereby preventing commutating signals from being generated.

6. Power supply according to claim 5, wherein the input of the opto switch (44) is connected to the measurement resistor (R) via a filter comprising a capacitor (43) in series with two resistors (41, 42), connected to each respective side of the capacitor, said capacitor being connected to said opto switch input and free ends of respective resistors being connected to a respective terminal of the measurement resistor (R).

7. Power supply according to claim 4, wherein at normal main power frequency of 50 Hz or 60 Hz the frequency of reconnection is about 2 kHz.

* * * * *